Nov. 22, 1960    J. B. ALFORD    2,961,184
KITE REEL
Filed Dec. 7, 1956    2 Sheets-Sheet 1
Fig. 1
Fig. 5
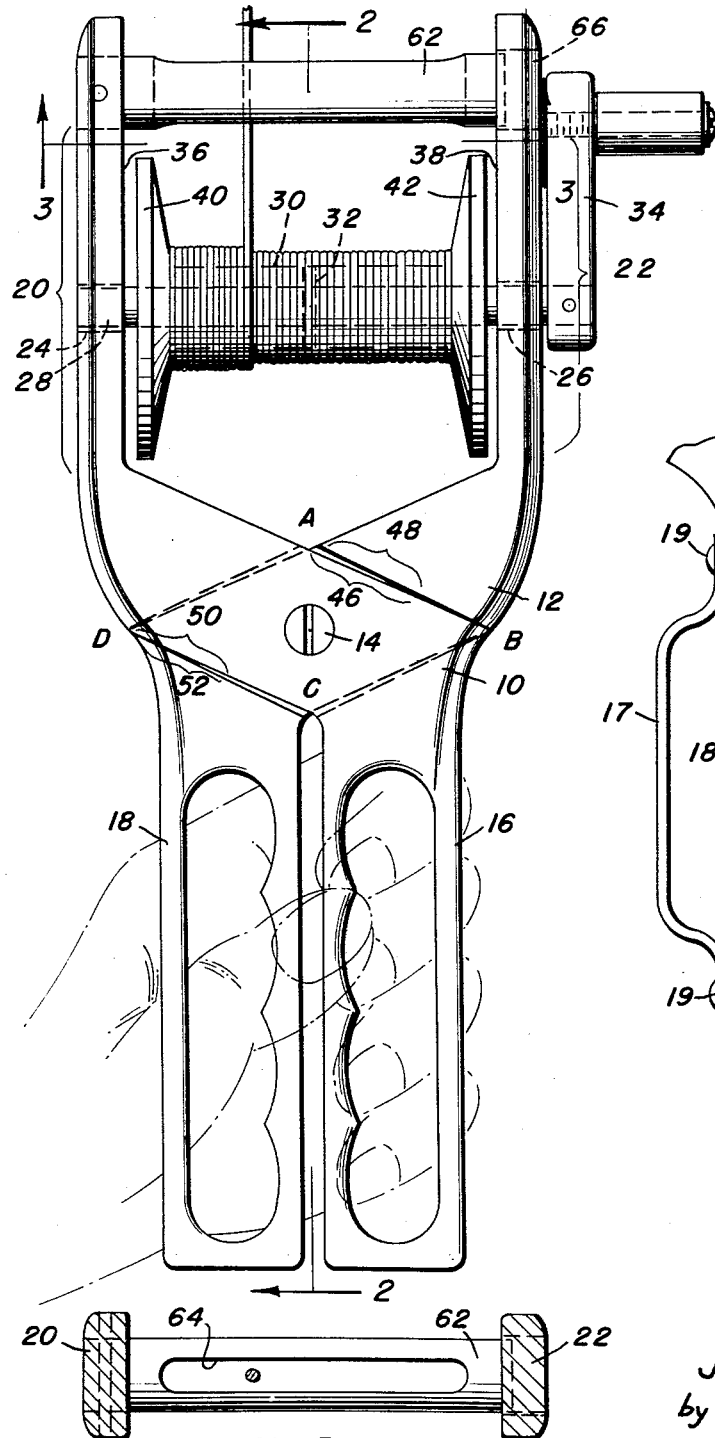
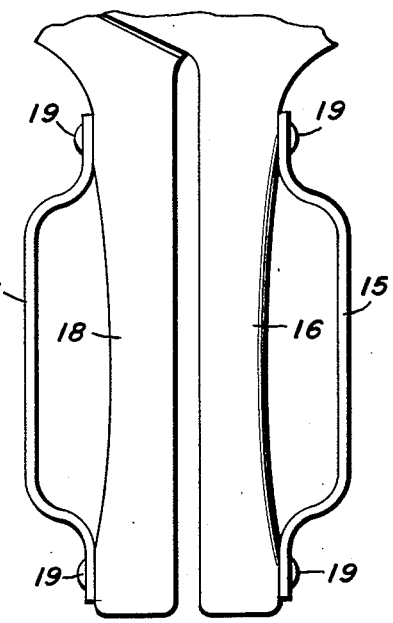
Fig. 3
INVENTOR
JOE B. ALFORD
by
*Parker + Philpitt*
his ATTORNEYS Nov. 22, 1960  J. B. ALFORD  2,961,184
KITE REEL
Filed Dec. 7, 1956  2 Sheets-Sheet 2
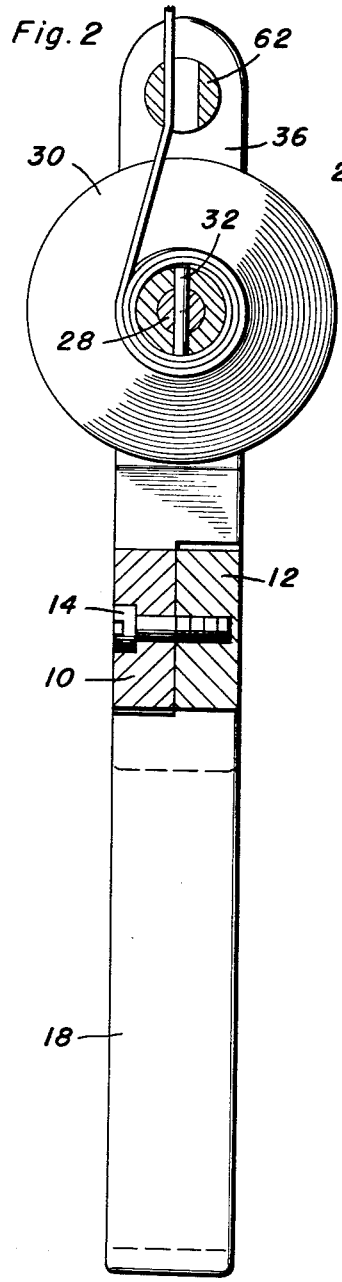
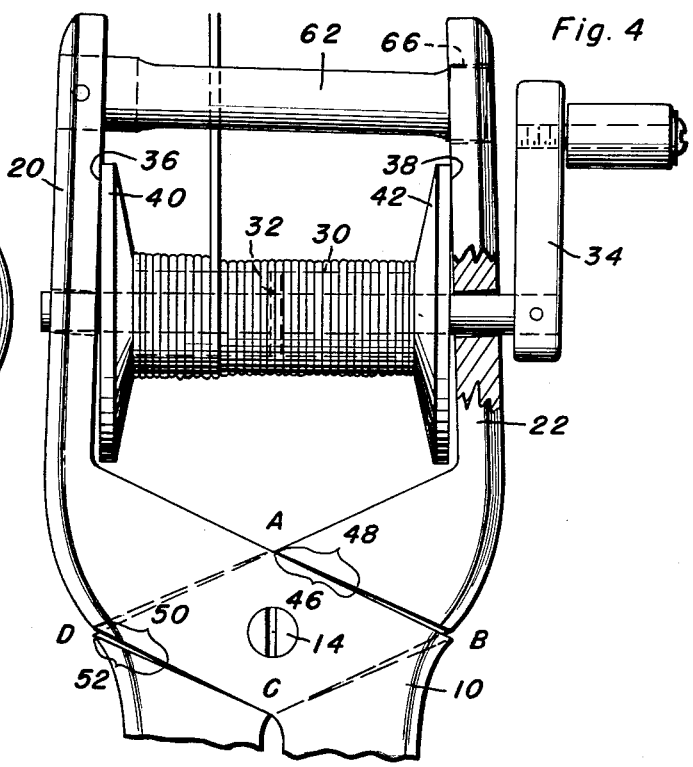
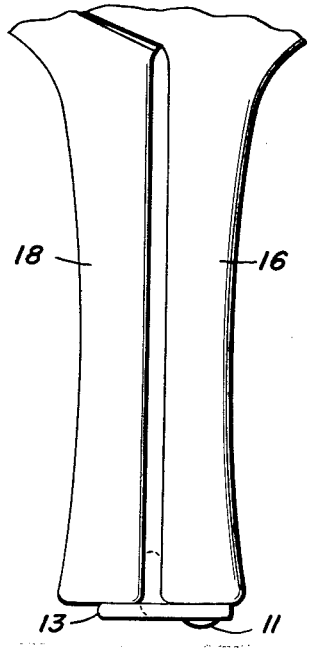
INVENTOR
JOE B. ALFORD
by Parker + Philpitt
his ATTORNEYS

United States Patent Office 2,961,184
Patented Nov. 22, 1960

2,961,184
KITE REEL
Joe B. Alford, 6171 St. Moritz, Dallas 14, Tex.
Filed Dec. 7, 1956, Ser. No. 627,021
2 Claims. (Cl. 242—96)

This invention generally pertains to a manually operated reel device and in one particular embodiment relates to a portable manually operable reel device for kite lines and the like.

The broad idea of flying kites with the aid of a reel device has been known for a number of years. For one reason or another, however, these reel devices have not enjoyed either a great deal of popularity with those who fly kites or any measurable degree of success with those manufacturers who are in a position to produce such devices. There appear to be several logical explanations for this. First of all, since most kites are flown by children it is absolutely essential that the kite reel be extremely simple in its construction so that a child can easily understand and operate it. Likewise, since kite reels are handled by children, the kite reel must be of simple and sturdy construction so that it will withstand the rough treatment which children usually give toys. A kite reel having only a few sturdy parts is highly desirable since it minimizes the chances of breakage and assures the minimum amount of expense when repairs do become necessary.

It is therefore an object of this invention to provide a novel portable and manually operable reel for kite lines and the like.

Another object of this invention is to provide a novel kite reel for children which is sturdy, compact, light in weight, and simple to operate.

A further object of this invention is to provide a kite reel having novel braking means which can be easily and substantially immediately actuated.

An additional object of this invention is to provide a novel kite reel which can be operated by a child of nearly any age with practically no danger that the reel will be damaged by accidental or purposeful improper operation.

Other objects, features, and advantages of the invention will become apparent by reading the accompanying description in relation to the drawings wherein:

Figure 1 is a front view in elevation of one embodiment of this invention;

Figure 2 is a side view, partly in section, of the reel device shown in Figure 1 taken along the line 2—2;

Figure 3 is a horizontal sectional view taken along the line 3—3 of Figure 1;

Figure 4 is a fragmentary view of the upper portion of the reel device of Figure 1 showing the relative positions of the parts when the spool is being braked;

Figures 5 and 6 are fragmentary views illustrating other types of handles which might be used in place of the handles shown in Figure 1.

Referring to the drawings, it will be seen that the reel consists of two cross fulcrum members 10 and 12 that are connected together in the cross-over area by a pivot pin 14 which passes through at least a portion of each fulcrum member. In the drawings the cross-over area is generally indicated by the area bounded by the letters A, B, C, and D. Preferably but not necessarily, each fulcrum member is substantially identical in size and shape so that the crossed fulcrum member arrangement merely amounts to two identical fulcrum members disposed 180 degrees out of phase with respect to each other. This arrangement minimizes manufacturing costs and facilitates assembly operations.

The lower portions of crossed fulcrum members 10 and 12 consists of hand grip sections 16 and 18. In the embodiment shown in Figure 1, these hand grip sections 16 and 18 contain curved grooves or slots which are adapted to loosely fit the fingers and thumb of the person operating the reel.

The upper portions of crossed fulcrum members 10 and 12 diverge away from each other and terminate in two end support sections 20 and 22. End support sections 20 and 22 contain apertures 24 and 26 which are adapted to receive opposite ends of shaft 28. Shaft 28 is adapted to carry a spool 30 and if desired the spool 30 may be keyed to the shaft 28 by a pin 32. One end of the shaft 28 is joined to a crank handle 34 which may merely be a continuation of the shaft or which may be a separate section that has been joined in any desired manner to one end of the shaft 28.

As shown in Figure 1, the opposite facing surfaces 36 and 38 of end support sections 20 and 22 are substantially parallel to each other and not in contact with the adjacent spool surfaces 40 and 42 of spool 30. In this position the shaft 28 and spool 30 are able to freely rotate within apertures 24 and 26. It will also be noted that in this position the abutting surfaces 46 and 48 of fulcrum members 10 and 12 are spaced apart while abutting surfaces 50 and 52 of fulcrum members 10 and 12 are in contacting and abutting relationship.

Referring now to Figure 4 it will be seen that the facing surfaces 36 and 38 of end support sections 20 and 22 are not exactly parallel to each other (in contrast to Figure 1) and are in fact in contact with the upper adjacent spool surfaces 40 and 42 spool 30. In this position the shaft 28 and spool 30 are not free to rotate because of the frictional forces between said facing surfaces 36 and 38 and the spool surfaces 40 and 42. This spool braking action is achieved by pressing the hand grip sections 16 and 18 together so that the abutting surfaces 46 and 48 are in turn pressed together or at least toward each other. It should be pointed out here that the angular relationships of the various components of the reel have been exaggerated somewhat in Figure 4 in order to better illustrate the nature of the spool braking action which may take place in accordance with the teachings of this invention. It is to be understood that the braking action resulting from frictional forces may extend over a greater area of the lateral faces of the spool ends than has been shown in Figure 4 without departing from the scope of this invention.

It will be appreciated that the primary purpose of the abutting surfaces 46, 48, 50, and 52 is to limit the degree to which the end support sections 20 and 22 can move in relation to each other. If one or more of these abutting surfaces is omitted there is the danger that either the inward movement of the end support sections will exert too great a force on the spool or the outward movement of the end support sections will cause disengagement or misalignment of shaft 20 and/or spool 30. It can be observed that the abutting surfaces 46 and 48 are probably of less importance since the opposite ends of the spool can effectively serve to limit the inward movement of the end support sections 20 and 22 in most instances.

By referring to Figure 4 again one can see that the pincers action of end support sections 20 and 22 might also possibly be utilized to brake the rotation of the spool without actually touching the ends of the spool. In other words, as the end support sections 20 and 22 move toward each other, the passageways 24 and 26 are inclined at an angle with respect to the axis of shaft 28. If the inside diameter of passageways 24 and 26 is only slightly larger than the outside diameter of shaft 28 then only a slight inward inclination of end support sections 20 and 22 will result in enough friction between the shaft 28 and the apertures 24 and 26 to produce an effective braking action. On the other hand, if the inside diameter of passageways 24 and 26 is a great deal larger than the outside diameter of shaft 28, then when the end support sections 20 and 22 move inwardly due to inward pressure on handle grips 16 and 18, then surfaces 36 and 38 will come into frictional engagement with spool surfaces 40 and 42 before any braking action can occur between passageways 24 and 26 and shaft 28.

In Figures 1–3 the upper extremities of end support sections 20 and 22 have been shown as including a transverse line guide member 62 containing slot 64 for confining and feeding the line from spool 30. Line guide member 62 is rigidly fixed at one end to end support section 20 but the other end of line guide member 62 is designed to freely slide back and forth within channel 66. When the end support sections 20 and 22 move toward and away from each other as previously described in order to effect a braking action on the spool 30, the line guide member 62 does not restrict this relative movement because of the manner in which the free end of guide member 62 is adapted to freely slide within channel 66.

Those skilled in the art will readily appreciate that a number of other line guide arrangements and designs could be provided. For example, the line guide member could consist of opposed telescoping tubes which would not inhibit relative movement of the end support sections 20 and 22.

The purpose of the line guide member 62 and slot 64 is to reduce the tendency of the cord wound on spool 30 to become fouled while the cord is being played out or while the cord is being reeled in. Such line guide members are generally desirable but certainly not necessary to the successful operation of the reel. Line guide members may in fact be entirely omitted if desired.

Figure 5 is a fragmentary view of two hand grip portions 16 and 18 which could be used in place of the hand grip portions shown in Figure 1. Straps 15 and 17 are shown fastened to hand grip portions 16 and 18 by means of screws 19, and these straps thus form means whereby the person using the reel may insert his fingers and thumb (in much the same manner as is shown in Figure 1).

In both Figures 1 and 5, the construction of the hand grip portions 16 and 18 enable the person holding the reel to quickly and easily shift from a braking to a nonbraking position by merely closing and opening his hand. When the hand is open the spool can rotate freely. When the hand is closed together braking of the spool occurs. This is a braking system so simple that even the youngest children can readily operate it without difficulty.

Figure 6 is a fragmentary view of two additional hand grip portions 16 and 18 which could be used in place of the hand grip portions shown in Figure 1. The hand grip portions 16 and 18 shown in Figure 6 are quite similar to the hand grip portions in Figures 1 and 5, but differs therefrom in that the hand grip portions are not moved away from each other by the mere act of opening the hand, but instead are moved apart by a slight prying or pulling action. If one desires to firmly grip the handles shown in Figure 6, but nevertheless does wish to effect a braking action, one means of preventing the hand grip portions 16 and 18 from coming too close together is to interpose a short length of a leather thong 13 between hand grip portions 16 and 18. The thong 13 can be fastened to one of the hand grip portions by a screw 11. The free end of thong 13 can be easily flicked in and out between hand grip portions 16 and 18 by the operator's finger.

It will be understood that whereas certain embodiments have been illustrated and described herein, the invention is by no means limited thereto. Those skilled in the art will readily see that numerous changes in shape, size, and arrangement of the various novel elements may be resorted to without departing from the spirit or scope of the invention.

By way of example, the components of the device of this invention may be made of wood, metal or plastic materials. The angular curvature of the fulcrum members might be varied considerably. The reel device of this invention, while particularly adapted for flying kites, could just as well be used for other purposes, such as fishing, wherein a string, wire, or cord is alternately fed out and then drawn in. The shaft and spool may be either integral or separate and there are numerous ways in which the spool can be attached to the shaft and likewise numerous ways in which the shaft or spool may be operatively connected to hand crank means. The surfaces which are to perform the braking action may be physically or chemically modified so as to improve the braking operation. The spool itself may be of any size or shape. Instead of using a leather thong to keep the hand grip portions apart, one might also use other wedge or cam means which could be readily manipulated into place by the reel operator. The hand grip portions may be varied in width, length, circumference, shape and taper. The fulcrum point may be varied considerably. The hand grip sections may be spaced at any desired distance apart depending upon the shape of the fulcrum members.

What is claimed is:

1. A portable manually operable reel for kite lines and the like comprising: two fulcrum members which cross at a point intermediate the ends of each fulcrum member; said fulcrum members being connected together at one point in the cross-over area by a pivot means; the upper portions of each fulcrum member diverging away from each other and terminating in two end support sections, a spool shaft carried by said end sections; a spool carried by said spool shaft and adapted to contain a length of string; the lower portion of each fulcrum member consisting of a hand grip section, both gripping sections being spaced closely enough together so that they can both be held in one hand and which can be moved toward and away from each other; the said two fulcrum members being so arranged that when the hand grip sections are brought together as closely as possible the two end support sections will be moved into engagement with the ends of said spool whereby said spool is restricted from rotating by said end suppost sections; a crank handle means attached to one end of said shaft; a line guiding means disposed between said two end support sections along a line generally parallel to said spool shaft, but being positioned further away from said pivot means than said spool shaft, said line guiding means consisting of a transverse member containing an elongated slot for confining and feeding the line from said spool, said transverse member of said line guiding means having one end thereof which is fixedly attached to one of said end support sections and the other end of said transverse member being constructed to slide freely within a channel located in the other end support section.

2. A kite reel in accordance with claim 1 wherein at least one of said hand grip sections has attached thereto a spacing means which can be manually moved into the area between the handles so as to thus limit both the closeness of the handles and the closeness of the said two end support sections in such a manner that the minimum distance between said two end support sections will be greater than the width of said spool.

References Cited in the file of this patent

UNITED STATES PATENTS

| | | |
|---|---|---|
| 205,094 | Huffman | June 18, 1878 |
| 404,732 | Reisinger | June 4, 1889 |
| 999,641 | Fuerst | Aug. 1, 1911 |
| 1,067,643 | Christner et al. | July 15, 1913 |
| 1,915,238 | Mosher et al. | June 20, 1933 |
| 2,185,673 | Luft | Jan. 2, 1940 |